(12) United States Patent
Dunn et al.

(10) Patent No.: US 6,674,689 B2
(45) Date of Patent: Jan. 6, 2004

(54) METHOD FOR MORPHOLOGIC ANALYSIS OF SEISMIC OBJECTS

(75) Inventors: Paul A. Dunn, Houston, TX (US); Marek K. Czernuszenko, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/395,911

(22) Filed: Mar. 24, 2003

(65) Prior Publication Data

US 2003/0193838 A1 Oct. 16, 2003

Related U.S. Application Data

(60) Provisional application No. 60/372,076, filed on Apr. 12, 2002.

(51) Int. Cl.[7] .............................. G01V 1/34; G01V 1/40
(52) U.S. Cl. .............................. 367/43; 367/63; 367/74; 702/17
(58) Field of Search .............................. 367/38, 43, 63, 367/74; 175/40, 50; 702/17

(56) References Cited

U.S. PATENT DOCUMENTS

| | | | | |
|---|---|---|---|---|
| 5,986,974 A | * | 11/1999 | Luo et al. ..................... | 367/41 |
| 6,052,651 A | * | 4/2000 | Fournier ..................... | 702/14 |
| 6,317,384 B1 | * | 11/2001 | Luo et al. ..................... | 367/47 |
| 6,438,273 B1 | * | 8/2002 | Loce et al. ................. | 382/296 |

FOREIGN PATENT DOCUMENTS

CN    1136668    *   1/1996

* cited by examiner

Primary Examiner—Nelson Moskowitz
(74) Attorney, Agent, or Firm—Keith A. Bell; Gary P. Katz

(57) ABSTRACT

A method for analyzing and classifying the morphology of seismic objects extracted from a 3D seismic data volume. Any technique may be used to extract the seismic objects from the 3D seismic data volume. According to the inventive method, one or more morphologic parameters are selected for use in classifying the morphology of the selected seismic objects. Geometric analyses are then performed on each seismic object to determine geometric statistics corresponding to the selected morphologic parameters. The results of these geometric analyses are used to classify the morphology of the seismic objects according to the selected morphologic parameters.

19 Claims, 10 Drawing Sheets

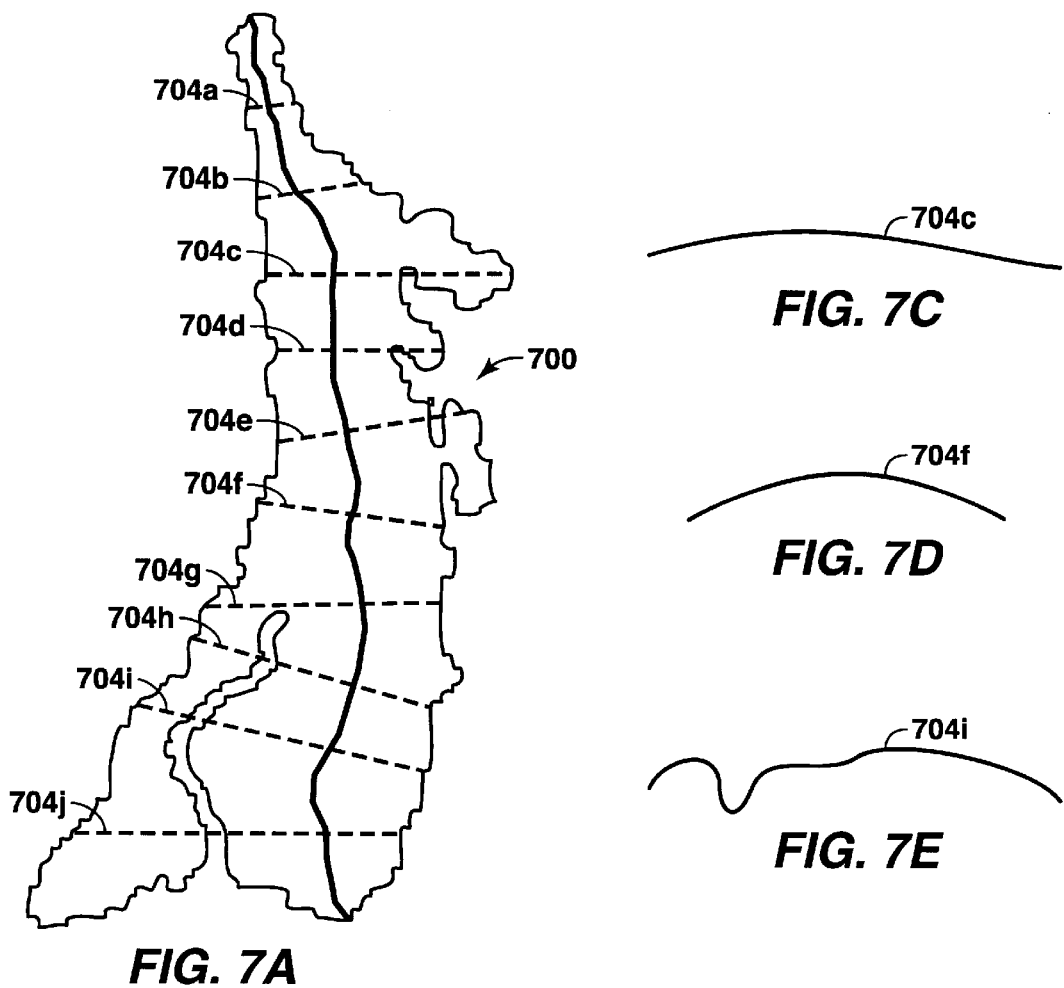
FIG. 7A
FIG. 7C
FIG. 7D
FIG. 7E
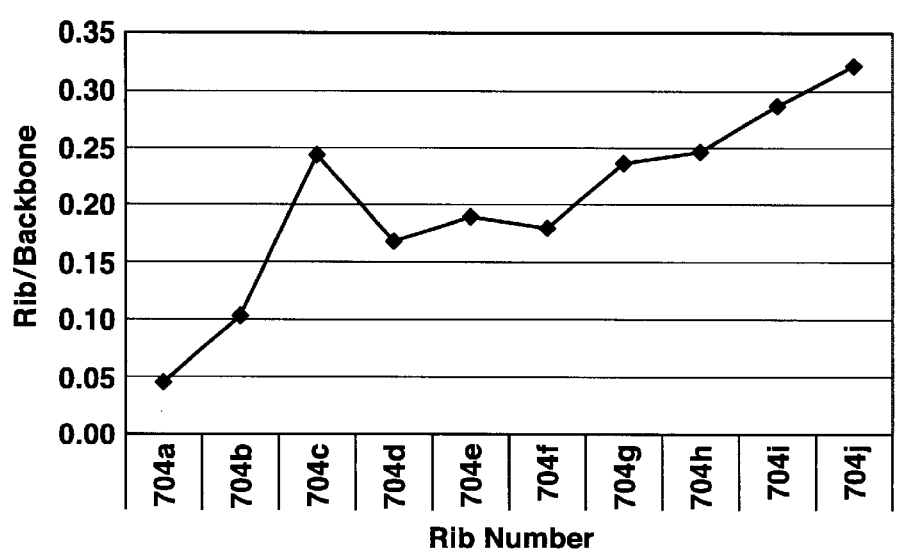
FIG. 7B

METHOD FOR MORPHOLOGIC ANALYSIS OF SEISMIC OBJECTS

This application claims the benefit of U.S. Provisional Application No. 60/372,076 filed on Apr. 12, 2002.

FIELD OF THE INVENTION

This invention relates generally to the field of geophysical prospecting and, more particularly, to seismic data interpretation. Specifically, the invention is a method for analyzing the morphology of seismic objects extracted from a three-dimensional (3D) seismic data volume.

BACKGROUND OF THE INVENTION

In the oil and gas industry, seismic prospecting techniques commonly are used to aid in the search for and evaluation of subterranean hydrocarbon deposits. A seismic prospecting operation consists of three separate stages: data acquisition, data processing, and data interpretation, and success of the operation depends on satisfactory completion of all three stages.

In the data acquisition stage, a seismic source is used to generate an acoustic impulse known as a "seismic signal" that propagates into the earth and is at least partially reflected by subsurface seismic reflectors (i.e., interfaces between underground formations having different acoustic impedances). The reflected signals (known as "seismic reflections") are detected and recorded by an array of seismic receivers located at or near the surface of the earth, in an overlying body of water, or at known depths in boreholes. The seismic energy recorded by each seismic receiver is known as a "seismic data trace."

During the data processing stage, the raw seismic data traces recorded in the data acquisition stage are refined and enhanced using a variety of procedures that depend on the nature of the geologic structure being investigated and on the characteristics of the raw data traces themselves. In general, the purpose of the data processing stage is to produce an image of the subsurface from the recorded seismic data for use during the data interpretation stage. The image is developed using theoretical and empirical models of the manner in which the seismic signals are transmitted into the earth, attenuated by subsurface strata, and reflected from geologic structures. The quality of the final product of the data processing stage is heavily dependent on the accuracy of the procedures used to process the data.

The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of an already discovered reservoir.

Currently, 3D seismic data is the preferred tool for subsurface exploration. As used herein, a "3D seismic data volume" is a 3D volume of discrete x-y-z or x-y-t data points, where x and y are mutually orthogonal, horizontal directions, z is the vertical direction, and t is two-way vertical seismic signal traveltime. These discrete data points are often represented by a set of contiguous hexahedrons known as "cells" or "voxels," with each cell or voxel representing the volume surrounding a single data point. Each cell or voxel typically has an assigned value of a specific seismic attribute such as seismic amplitude, seismic impedance, or any other seismic data attribute that can be defined on a point-by-point basis.

A common problem in interpretation of a 3D seismic data volume is the extraction of "seismic objects" from the data volume and evaluation of their geometric relationships to each other. A "seismic object" is defined as a region of the 3D seismic data volume in which the value of a certain selected seismic attribute (e.g., acoustic impedance) satisfies some arbitrary threshold requirement, i.e., is either greater than some minimum value or less than some maximum value. At a certain threshold, two such regions may not be connected (i.e., they are two separate seismic objects); at a different threshold, they may be connected (i.e., a single seismic object). The interpreter must decide which threshold depicts a scenario that is more consistent with other known information about the subterranean region in question. Selection of an appropriate threshold is not always straightforward, and it may take multiple iterations to achieve the desired result which, of course, is that the seismic objects should correspond to actual underground reservoirs.

One technique for identifying and extracting seismic objects from a 3D seismic data volume is known as "seed picking." Seed picking results in a set of voxels in a 3D seismic data volume, which fulfill user-specified attribute criteria and are connected. Seed picking has been implemented in several commercial software products such as VoxelGeo®, VoxelView®, GeoViz®, Gocad®, and others. Seed picking is an interactive method, where the user specifies the initial "seed" voxel and attribute criteria. The seed picking algorithm marks an initial voxel as belonging to the current object, and tries to find neighbors of the initial voxel that satisfy the specified attribute criteria. The new voxels are added to the current object, and the procedure continues until it is not possible to find any new neighbors fulfilling the specified criteria.

Seed picking requires a criterion for connectedness. There are two criteria commonly used, although others may be defined and used. One definition is that two voxels are connected (i.e., are neighbors) if they share a common face. By this definition of connectivity, a voxel can have up to six neighbors. The other common criterion for being a neighbor is sharing either an edge, a face, or a comer. By this criterion, a voxel can have up to twenty-six neighbors.

Another technique for identifying and extracting seismic objects from a 3D seismic data volume is by identifying discontinuities in the data using trace-to-trace correlations. These discontinuities may be assumed to represent the boundaries between contiguous seismic objects.

Current techniques for extracting seismic objects from 3D seismic data volumes fail to capture the valuable information about subsurface stratigraphy that is represented by the morphology of the extracted seismic objects. There is clearly a need for a method for capturing this information. Such a method preferably should be capable of analyzing a wide range of morphologic parameters and of operating automatically based on user-specified input conditions. The present invention satisfies this need.

SUMMARY OF THE INVENTION

In a first embodiment, the invention comprises a method for analyzing and classifying the morphology of a seismic object extracted from a 3D seismic data volume comprising the steps of (a) selecting one or more morphologic parameters for use in classifying the morphology of the seismic object, (b) performing geometric analyses of the seismic object to determine geometric statistics corresponding to the morphologic parameters, and (c) using the geometric statistics to classify the morphology of the seismic object according to the morphologic parameters. The seismic object may comprise any type of seismic data, including but not limited to seismic amplitude data, seismic impedance data, and seismic attribute data.

In another embodiment, the invention includes the steps of fitting one or more surfaces to the seismic object and performing geometric analyses of these surfaces. Typically, these surfaces would comprise surfaces conforming to the top, middle, or base of the seismic object.

In another embodiment, the invention also includes the step of extracting one or more seismic objects from the original 3D seismic data volume. The seismic object(s) may be extracted using any known technique. For example, the seismic object(s) may be extracted using multi-threshold, nested, bulk seed detection linked to an interactive hierarchical tree interface. Alternatively, discontinuity analysis may be performed on the original 3D seismic data volume to identify boundaries between contiguous seismic objects.

The inventive method may be used to classify seismic objects according to a wide variety of morphologic parameters, including without limitation perimeter, area, volume, maximum thickness, minimum thickness, mean thickness, standard deviation of thickness, major and minor axes from principal component analyses, hierarchical medial axis skeleton analysis, 3D edge and surface curvature analysis, and time-conformable edge analysis.

BRIEF DESCRIPTION OF THE DRAWINGS

FIGS. 7A and 7B illustrate a method for analyzing a complex shape by adding a series of orthogonal ribs to a first order medial axis skeleton backbone and plotting the ratio of rib length to backbone length versus rib number.

FIGS. 7C, 7D, and 7E illustrate surface curvature analysis of a seismic object using vertical profiles of the backbone and ribs for a selected surface.

DETAILED DESCRIPTION

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that are included within the spirit and scope of the invention, as defined by the appended claims.

Three-dimensional (3D) seismic surveys contain abundant information about subsurface stratigraphy. One aspect of seismic data interpretation which is often overlooked is the morphology (i.e., the shape and structure) of seismic objects which can be extracted from 3D seismic data volumes. The morphology of these seismic objects carries information about their origins and properties. The present invention is a method for analyzing and classifying a wide range of geometries of seismic objects extracted from 3D seismic amplitude, impedance, or attribute cubes. The results of these analyses can be used to assess reservoir quality for hydrocarbon exploration and to populate the extracted seismic objects with the properties necessary to model reservoir behavior during hydrocarbon production.

Preferably, the inventive method is practiced using a suitably programmed digital computer. Persons skilled in the art of computer-aided seismic data processing and interpretation could easily develop computer software for practicing the inventive method based on the teachings set forth herein. Preferably, the computer software should be capable of automatically extracting seismic objects from a 3D seismic data volume and processing the extracted seismic objects based on user-specified input conditions.

Figure 1A:
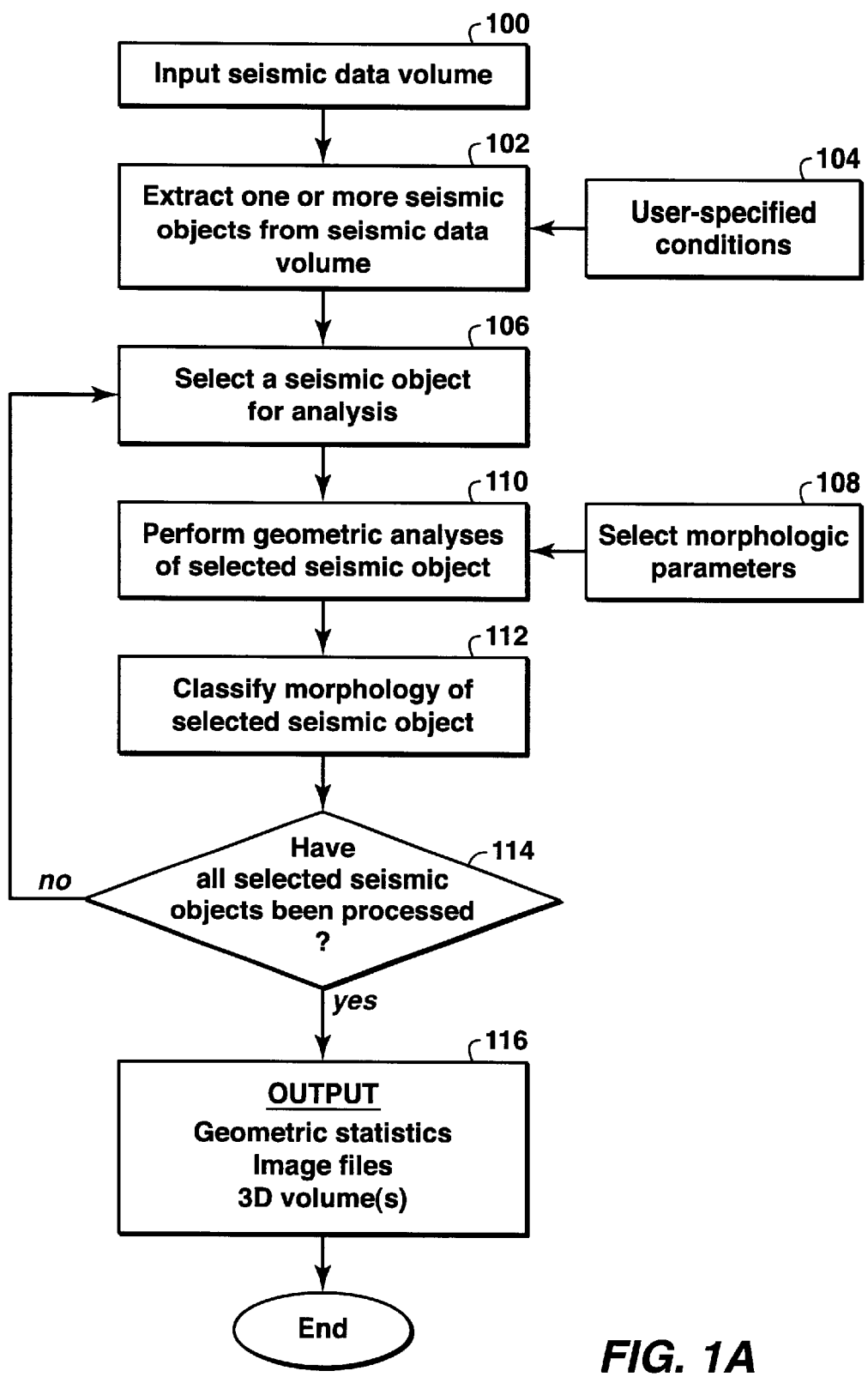
FIGS. 1A and 1B are flow charts illustrating the primary steps of two embodiments of the present invention.

FIG. 1A is a flow chart illustrating the primary steps of a first embodiment of the present invention. The input seismic data volume 100 may comprise any type of data capable of being defined on a point-by-point basis, including without limitation seismic amplitude data volumes, seismic impedance data volumes, and seismic attribute data volumes.

At step 102, one or more seismic objects are extracted from the seismic data volume. Preferably, these seismic objects are extracted according to user-specified conditions 104, such as minimum and maximum object size and/or attribute threshold limits.

One preferred method for extracting seismic objects from a 3D seismic data volume is described in copending patent application Ser. No. 10/195,582, filed Jul. 15, 2002, and entitled "Method for Pefforming Object-Based Connectivity Analysis in 3D Seismic Data Volumes." According to this method, the seismic objects are extracted from the 3D seismic data volume by (a) dividing the seismic data volume into cells and determining from the seismic data the value of a preselected seismic attribute in each cell, (b) choosing a threshold criterion for the value of the seismic attribute, (c) determining for each cell whether the value of the selected attribute for that cell satisfies the chosen criterion, (d) identifying seismic objects containing only connected cells that satisfy the attribute criterion, using a preselected definition of connectivity, (e) repeating steps (b) through (d) for at least one different value of the attribute threshold, and (f) tracking each seismic object identified for changes in its size, spatial position, and connection to other objects, all as a function of attribute threshold value.

According to another embodiment of the present invention, the seismic objects are extracted from the 3D seismic data volume by performing a discontinuity analysis on the 3D seismic data volume to identify boundaries between seismic objects. Such discontinuity analysis may be performed according to the method described in U.S. Pat. No. 6,490,528, and entitled "Method for Imaging Discontinuities in Seismic Data." According to this method, structural and stratigraphic discontinuities are identified in a 3D volume of seismic data samples by defining a plurality of directions in the 3D volume and a series of sequentially less restrictive thresholds. For each data sample in the seismic data volume, one-dimensional, two-trace discontinuity values are calculated for the data sample sequentially along the defined directions and the first of the calculated discontinuity values that satisfies the first threshold is stored in the output discontinuity volume. If none of the calculated discontinuity values satisfies the first threshold, they are then sequentially compared to the next less restrictive threshold and the first of the discontinuity values that satisfies the selected threshold is stored in the output discontinuity volume. In this way, a 3D volume that identifies trace-to-trace discontinuities in the original seismic data is generated. These trace-to-trace discontinuities may be assumed to represent boundaries between contiguous seismic objects.

Other methods for extracting the seismic objects from the 3D seismic data volume will be known by or apparent to persons skilled in the art. All such methods are deemed to be within the scope of the present invention. All that is required is that the chosen method be capable of extracting one or more seismic objects from a 3D seismic data volume for further analysis as described below.

At step 106, a seismic object is selected for analysis, and at step 108, one or more morphologic parameters for use in analyzing and classifying the morphology of the seismic object are selected. Next, at step 110, geometric analyses of the selected seismic object are performed to determine geometric statistics corresponding to the selected morphologic parameters. At step 112, these statistics are then used to classify the morphology of the selected seismic object according to the selected morphologic parameters.

Next, at step 114, the inventive method determines whether all extracted seismic objects have been processed. If not, the method repeats steps 106 through 112 for each of the other extracted seismic objects. If all extracted seismic objects have been processed, the method proceeds to step 116 where geometric statistics, image files, and 3D volumes for the extracted seismic objects are output. The process then ends.

Figure 1B:
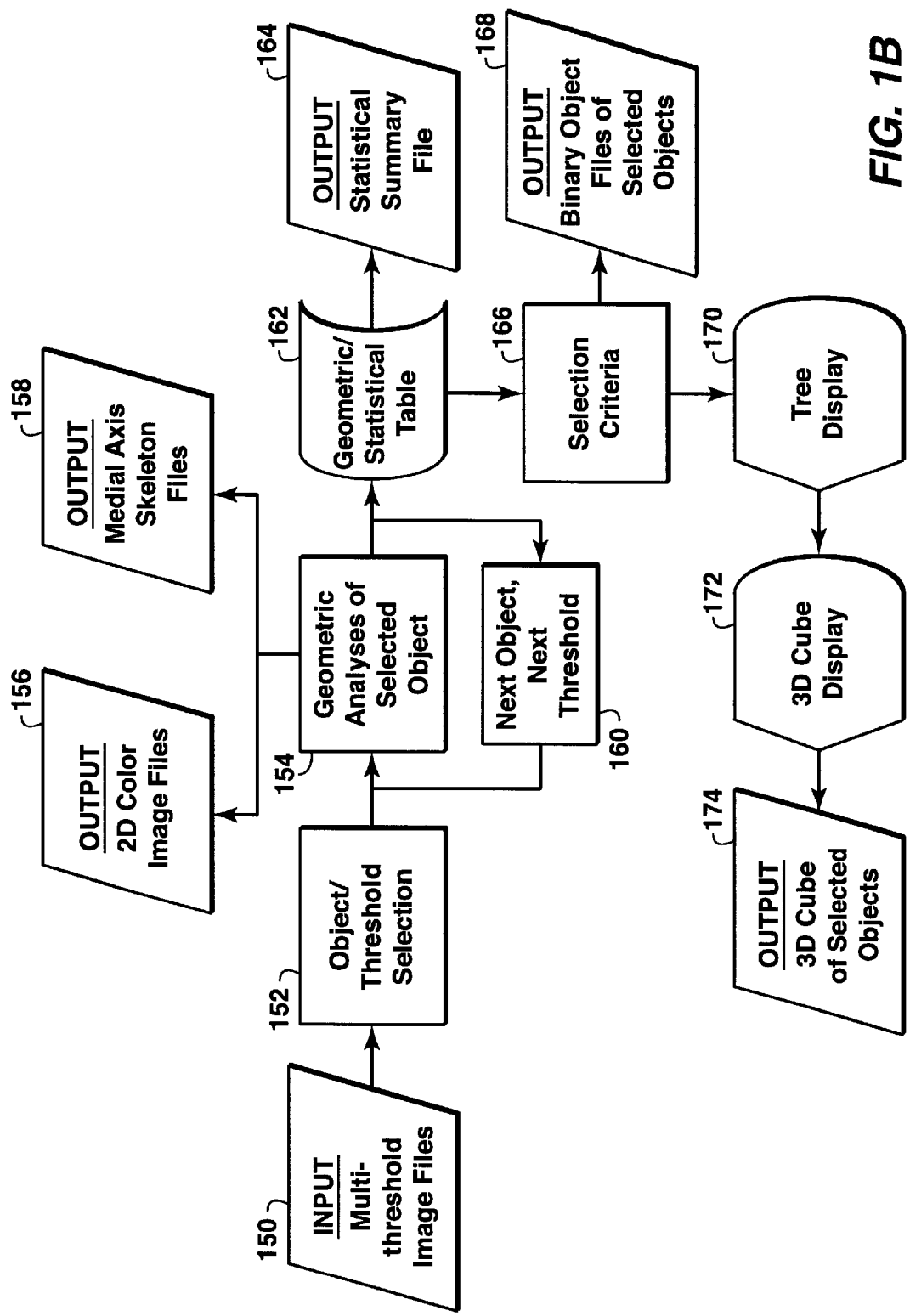

FIG. 1B is a flow chart illustrating the primary steps of a second embodiment of the present invention. In this embodiment, the input seismic data 150 comprise multi-threshold seismic object files extracted from a 3D seismic data volume using multi-threshold, nested, bulk seed detection linked to an interactive hierarchical tree interface, as described in U.S. patent application Ser. No. 10/195,582 (referenced above). The user may set size and shape criteria for automatic selection of seismic objects for further analysis and classification, or individual or groups of seismic objects may be selected through visual reconnaissance of the 3D seismic data volume using the tree interface as a guide. Surfaces can be fit to the selected seismic objects (top, middle, or base of body) and they can be classified by a wide variety of morphologic parameters.

Figure 2A:
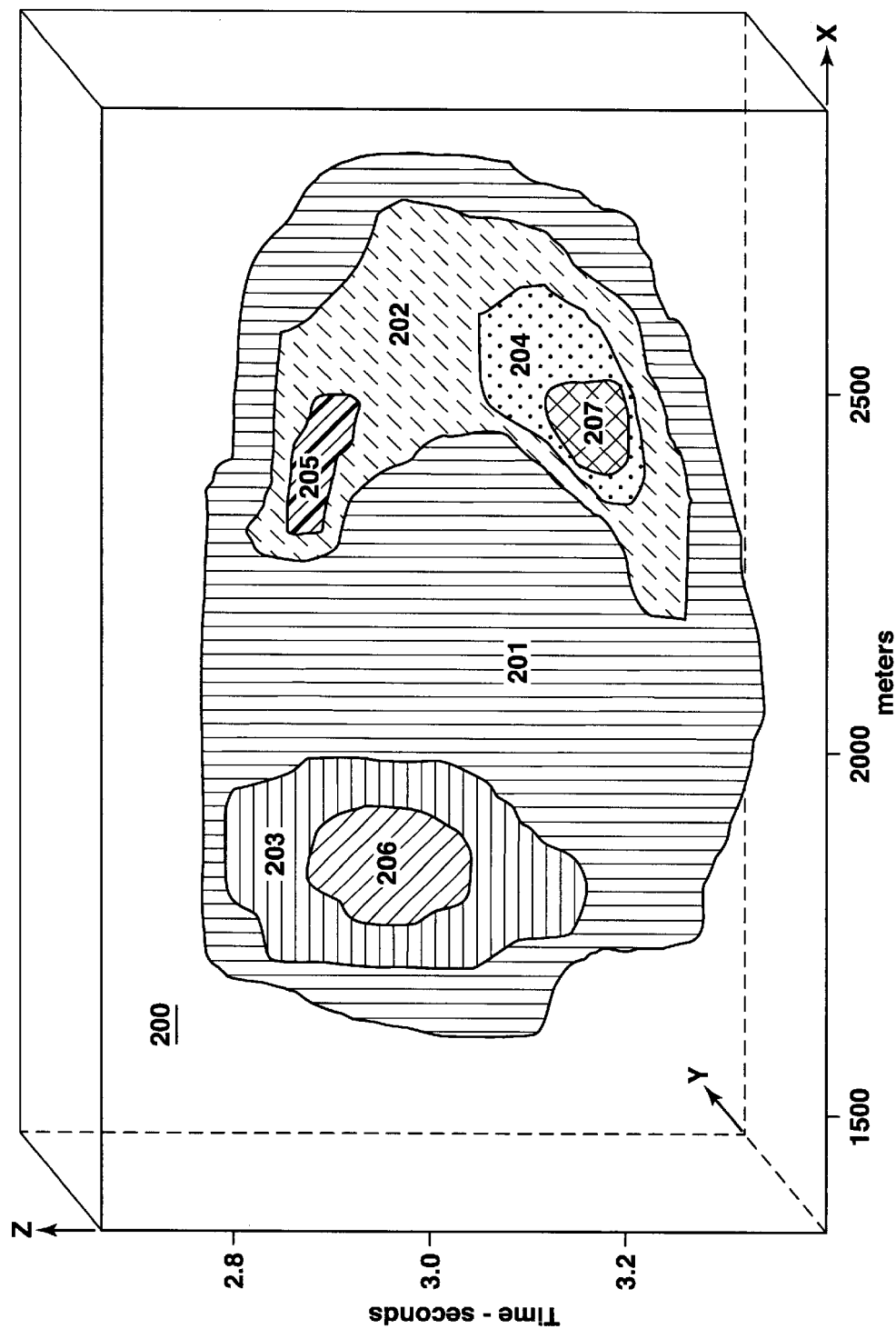
FIGS. 2A and 2B illustrate, respectively, seismic objects extracted from a 3D seismic data volume using a multi-threshold seed detection and an interactive tree interface linked to the extracted seismic objects.
Figure 2B:
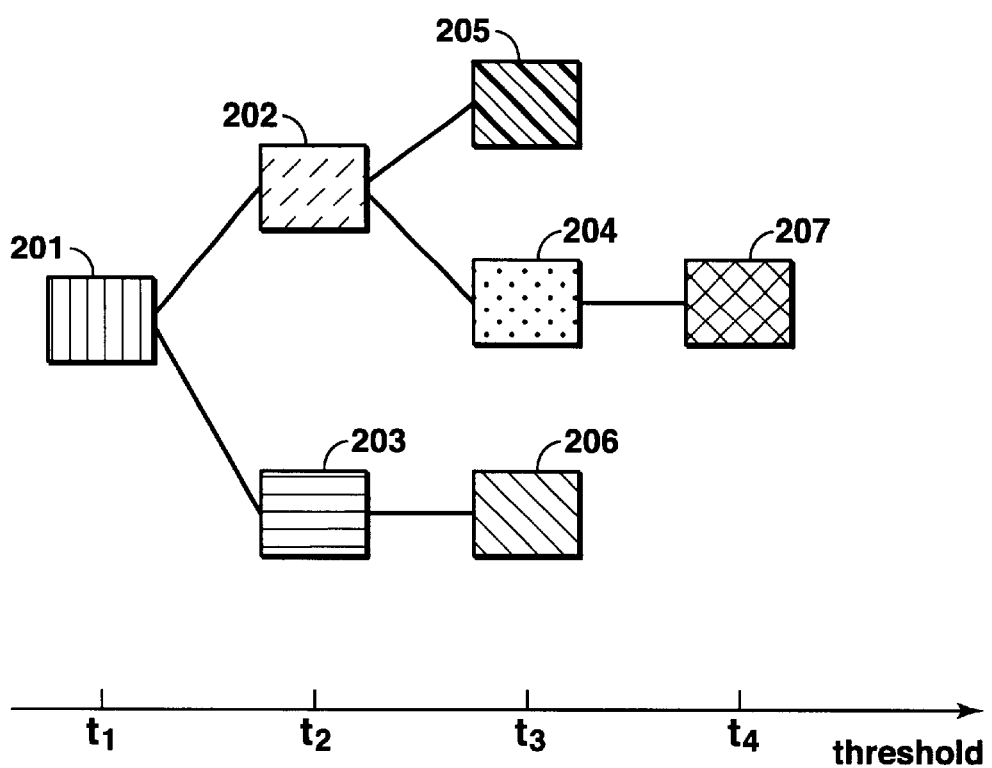

FIGS. 2A and 2B illustrate the multi-threshold, nested, bulk seed detection process for extracting seismic objects from a 3D seismic data volume. First, a preselected seismic attribute is determined for each voxel in 3D seismic data volume 200. Next, a first threshold value for the seismic attribute is chosen, and the value of the seismic attribute for each voxel is examined to determine whether it satisfies the first threshold. Next, seismic objects containing only connected cells that satisfy the first threshold, using a preselected definition of connectivity, are identified. This results in identification of seismic object 201. The above steps may be repeated for one or more increasingly restrictive threshold values for the seismic attribute, resulting in identification of seismic objects 202 through 207.

Referring now to FIG. 2B, seismic objects 201 through 207 are shown in a connectivity tree. At the first threshold, $t_1$, only seismic object 201 is identified. However, at the next more restrictive threshold, $t_2$, seismic object 201 has divided into two separate seismic objects 202 and 203. At the next more restrictive threshold, $t_3$, seismic object 202 has divided into two more seismic objects 204 and 205. Seismic object 203 has not divided, but has shrunk to a smaller seismic object 206. At the most restrictive threshold, $t_4$, seismic objects 205 and 206 have disappeared entirely, while seismic object 204 has shrunk to a smaller seismic object 207. The present invention may be used to analyze and classify the geometry of all of these seismic objects.

Returning to FIG. 1B, at step 152 a seismic object for a specific level of the threshold criterion is selected, and at step 154 a range of geometric analyses are performed on the selected seismic object. Possible outputs from this step include 2D color image files 156 and medial axis skeleton parameter files 158 (described in more detail below) for the selected object. At step 160 the process iterates until all extracted objects at all threshold levels have been analyzed.

The result of the geometric analyses is statistical table 162, which may be output to a statistical summary file 164. Statistical table 162 will contain statistics on a wide range of geometric analyses of each seismic object extracted from the 3D seismic data volume.

At step 166 selection criteria for classifying the seismic objects are applied to the data contained in statistical table 162, and binary files for the selected objects are output at 168. Examples of the selection criteria that may be used include, but are not limited to, object size, length, length-width ratio, azimuth of principal axis, and a range of measurements based on skeletal parameters. Data from the selected objects may be incorporated into the interactive tree display 170 and the 3D cube display 172.

The final products of the process include 2D color image files 156, medial axis skeleton parameter files 158, a statistical summary file 164, binary object files 168 specifying the locations and attributes of the selected object (used for later visualization of these data), and a 3D cube of seismic objects 174 that meet the user specified criteria. This cube can be accessed by the hierarchical tree interface when more than one threshold level has been selected.

Figures 3A, 3B:
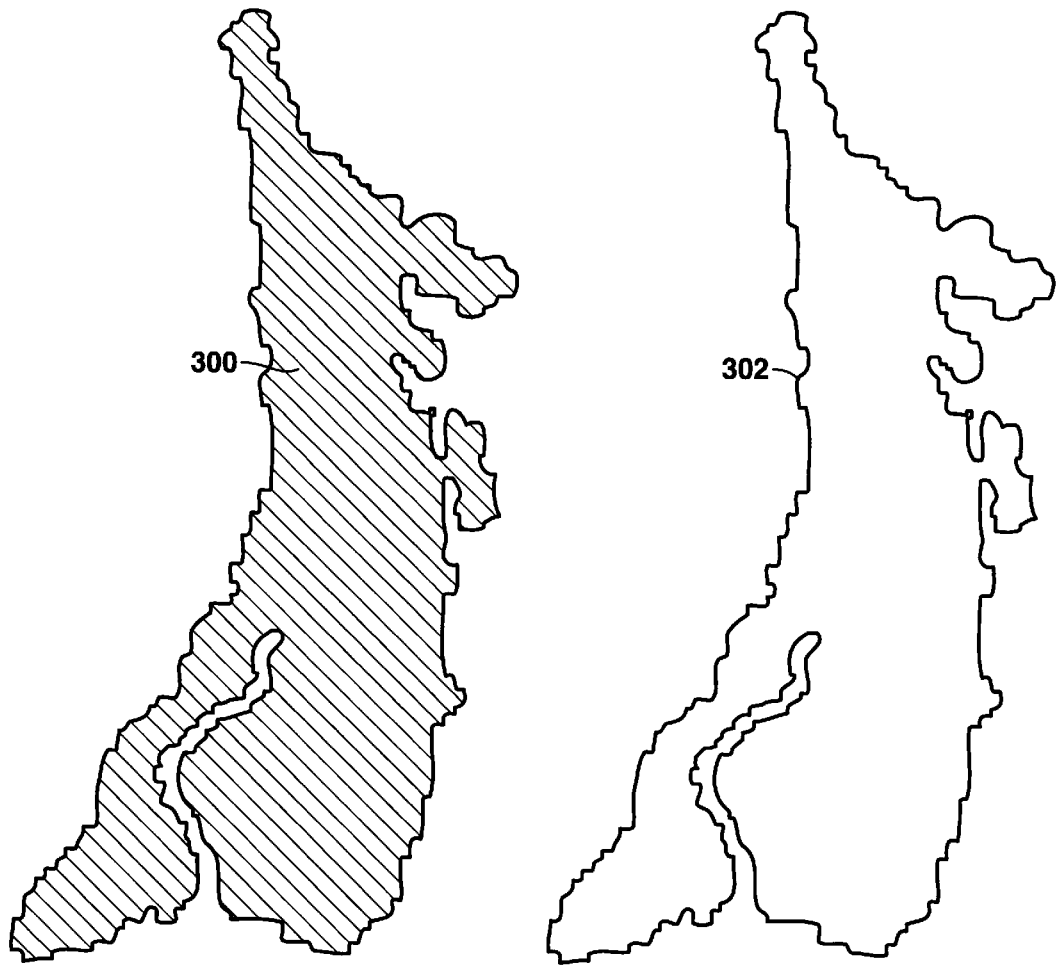
FIGS. 3A and 3B illustrate the measurement of 2D geometric parameters for area (FIG. 3A) and perimeter (FIG. 3B) for a plan view (i.e., map view) projection of a 3D seismic object.

The present invention is capable of analyzing and classifying seismic objects according to a wide variety of morphologic parameters. Some of these morphologic parameters relate to 2D characteristics such are area or perimeter. In such case, it may be necessary to fit a surface to the extracted seismic object. Such a surface would typically conform to the top, middle, or base of the seismic object. Alternatively, the analysis may be performed on a 2D plan view (i.e., map view) projection of the seismic object. For example, FIGS. 3A and 3B illustrate, respectively, the area 300 and perimeter 302 from a map view projection of a 3D seismic object. Typically, both area and perimeter would be measured in voxels, with the perimeter being the number of voxels located along the outer edge of the seismic object and area being the number of voxels contained inside the perimeter.

Figure 4A:
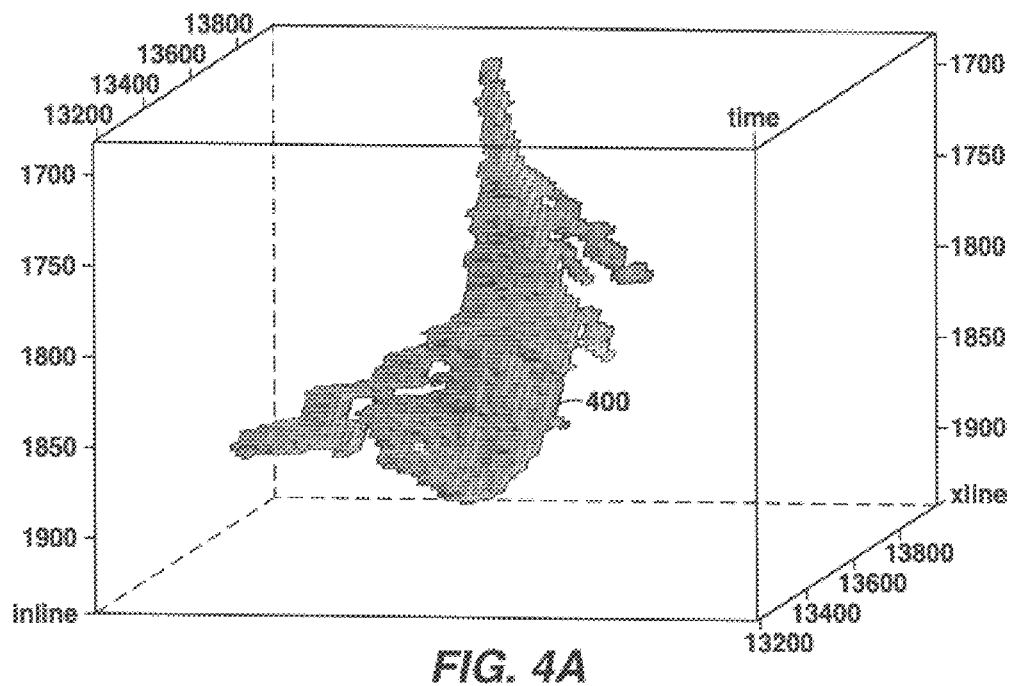
FIGS. 4A and 4B illustrate the measurement of volume (FIG. 4A) and thickness (FIG. 4B) parameters for a 3D seismic object.

Other morphologic parameters relate to 3D characteristics such as volume. FIG. 4A shows a 3D seismic object 400. Typically, the volume of seismic object 400 would be measured by the number of voxels contained therein.

Figure 4B:
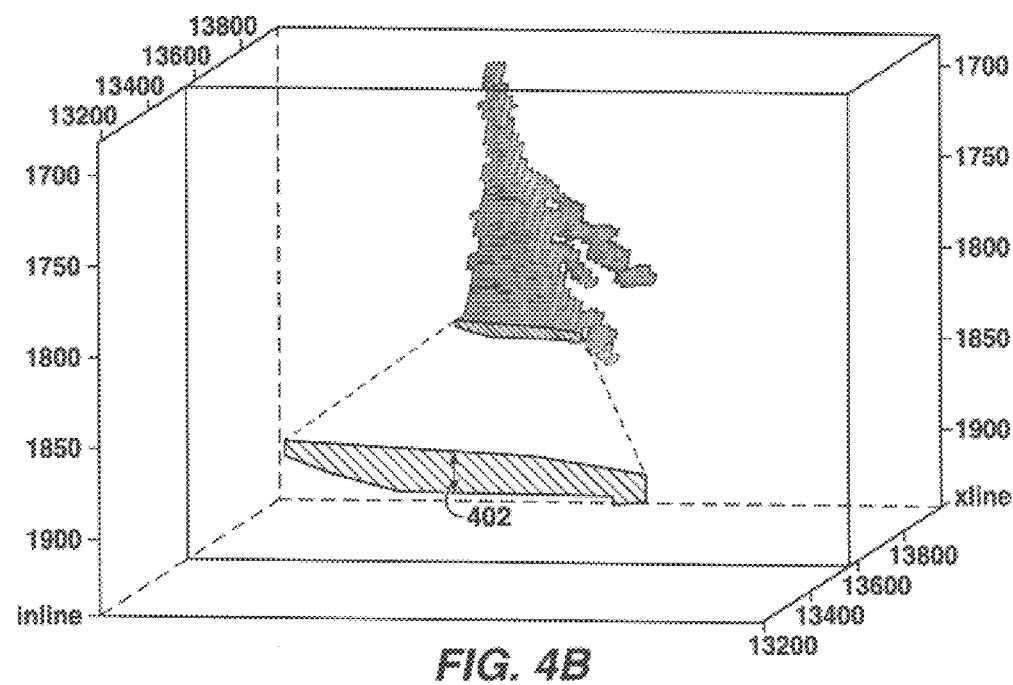

FIG. 4B shows another important morphologic parameter, vertical thickness 402, which may be expressed as either a distance or two-way seismic signal traveltime. The vertical thickness can be measured at each x-y position in the seismic object, and the maximum, minimum, mean, and standard deviation of thickness may be determined for the seismic body.

Figure 5:
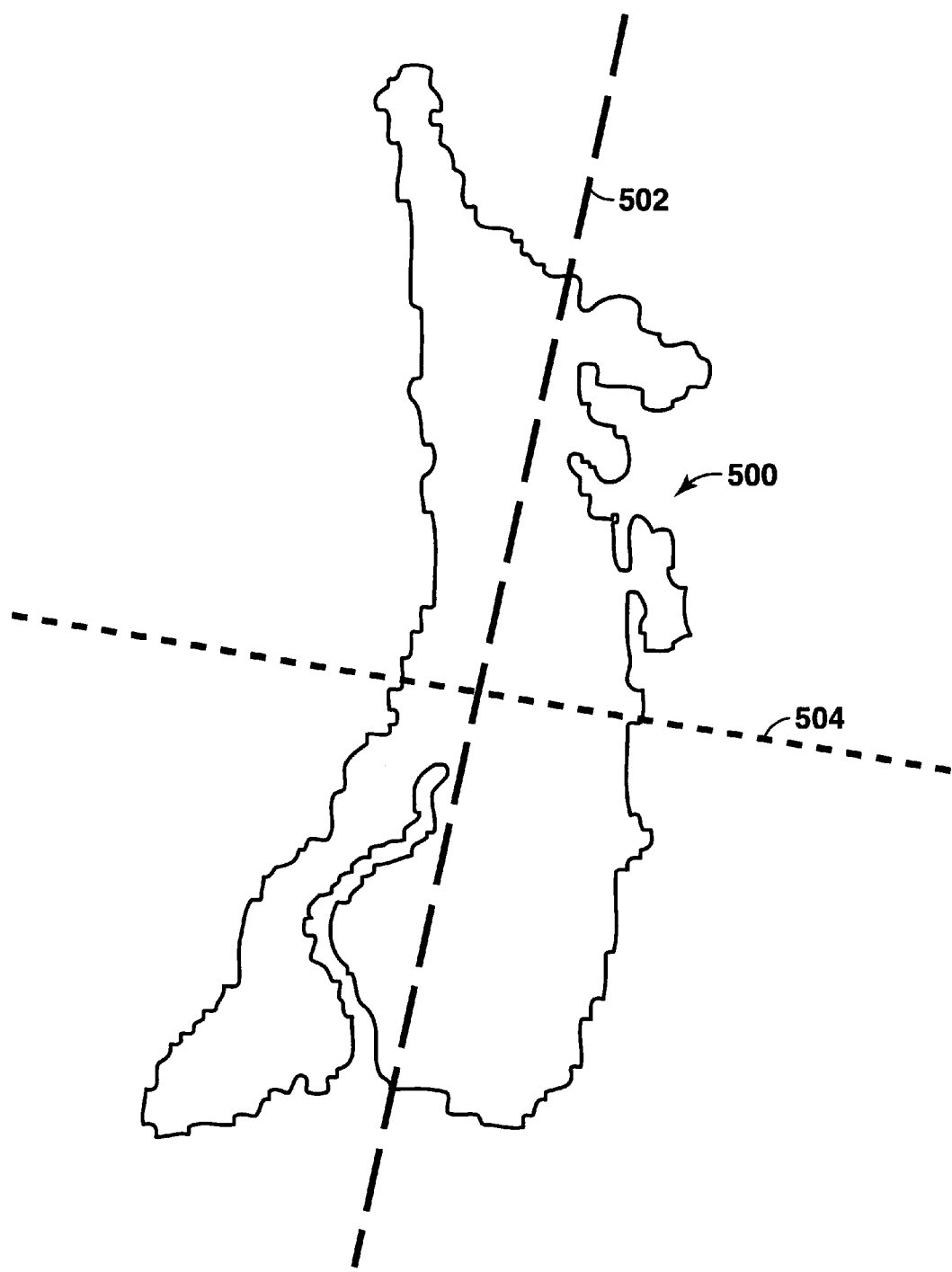
FIG. 5 illustrates principal component analysis of a 2D view of a 3D seismic object.

FIG. 5 illustrates a 2D shape 500 which may be a surface of a seismic object, a map view of a seismic object, or any other 2D shape associated with a seismic object. Principal component analysis is used to identify first principal axis 502 and second principal axis 504. The first principal component axis for spatial data can be thought of as the dominant axis of spatial correlation. Principal component analysis is a mathematical procedure that transforms a number of variables that may be correlated into a smaller number of uncorrelated variables called principal components. The objectives of principal component analysis are to ascertain or to reduce the dimensionality of the data set and to identify new underlying variables. The first principal component accounts for as much of the variability in the data as possible, with each succeeding component accounting for as much of the remaining variability as possible.

Figure 6:
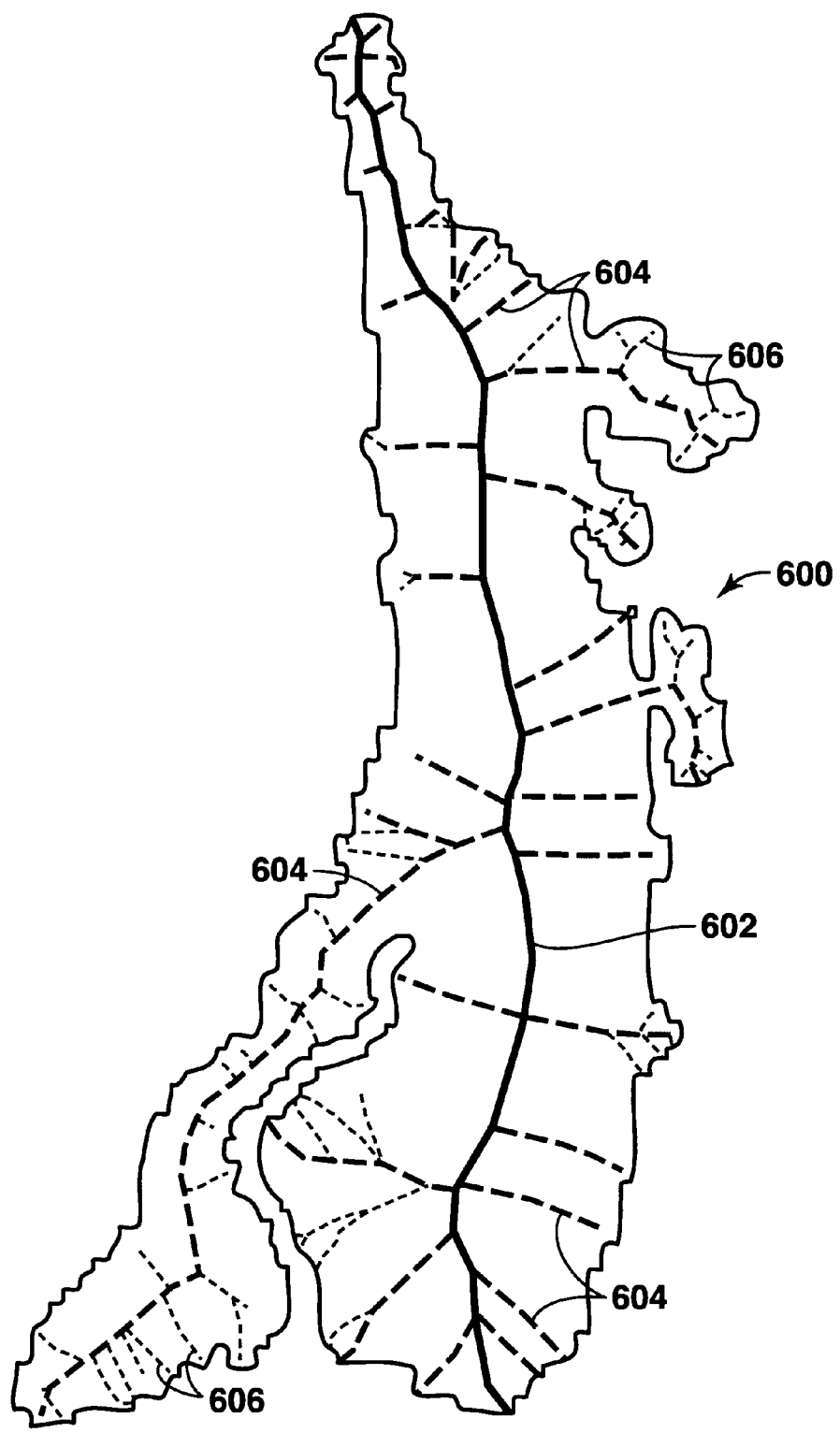
FIG. 6 illustrates medial axis skeletonization of a 2D view of a 3D seismic object.

FIG. 6 illustrates a medial axis skeleton for 2D seismic body 600, which is constructed using the methodology of Ogniewicz and Kubler (see, R. L. Ogniewicz and O. Kubler, "Hierarchic Voronoi Skeletons," *Pattern Recognition*, 1995). This method results in determination of first order skeleton branch 602, second order skeleton branches 604, and higher order branches 606. For clarity, reference numerals have been included for only a few second order skeleton branches 604 and higher order skeleton branches 606. The original shape of seismic body 600 can be reconstructed to higher levels of accuracy by including increasing orders of branches. Each branch can be thought of as the medial path described by the centers of a series of disks drawn such that they are tangent to the shape outline in two places. Medial axis skeletons can be used to compare and contrast the geometric properties of shapes over a wide range of length scales and backbone configurations. This 2D framework can be adapted to represent 3D objects by placing the first order skeleton branch in the 3D object at a position in the middle of the object's thickness.

FIGS. 7A and 7B illustrate a variation of the medial axis skeleton for a 2D seismic object 700. In FIG. 7A, first order skeleton branch 702 becomes a "backbone" which is fitted with a series of ten orthogonal "ribs" 704a to 704j which span the full width of the shape. Preferably, the ribs 704a–j are equally spaced along first order skeleton branch 702, and each rib is perpendicular to first order skeleton branch 702. FIG. 7B is a plot of the ratio of "rib length" to "backbone length" versus rib number. By reducing a complex shape to such measurements, shapes of different backbone lengths and curvatures can be readily compared and classified using graphical and numerical techniques such as principal component analysis.

FIGS. 7C, 7D, and 7E illustrate surface curvature analysis of seismic object 700. Preferably, vertical profiles of backbone 702 and ribs 704a–j are constructed for both the top and base surfaces of seismic object 700 (only the top surface profiles for ribs 704c, 704f, and 704i are shown, respectively). The degree of convexity or concavity for each profile is calculated by fitting a second order (or higher) polynomial function to the profile. Results may be recorded in the statistical summary table 162 (FIG. 1B).

Figure 8A:
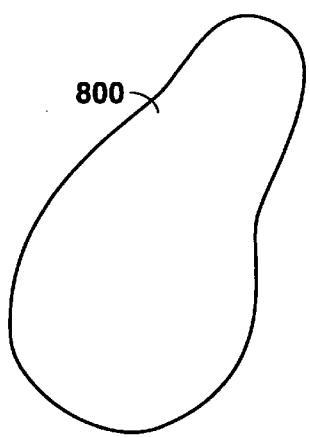
FIGS. 8A and 8B illustrate planform truncation analysis of a seismic object.
Figure 8B:
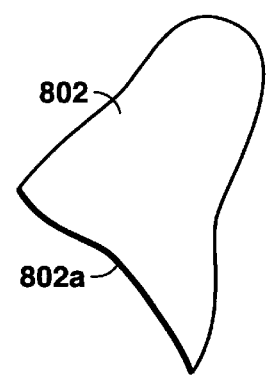

FIGS. 8A and 8B illustrate truncation analysis of the seismic object planform (i.e., map view). Planform shapes for two seismic objects 800 and 802 are shown. Possible truncated edges are identified by curvature analysis of the planform shape to identify locations where the perimeter changes direction abruptly, and a truncation index is calculated for each shape. The truncation index is equal to the fraction of the shape's perimeter which has been identified as a possible truncation. In FIG. 8A, curvature analysis of seismic object 800 did not identify any possible truncations, and therefore, seismic object 800 has a truncation index of 0. However, curvature analysis of seismic object 802 in FIG. 8B identified a possible truncation 802a, and the ratio of the length of possible truncation 802a to the perimeter of seismic object 802 gives a truncation index of about 0.3. These results may be recorded in the statistical summary table 162.

Figure 9:
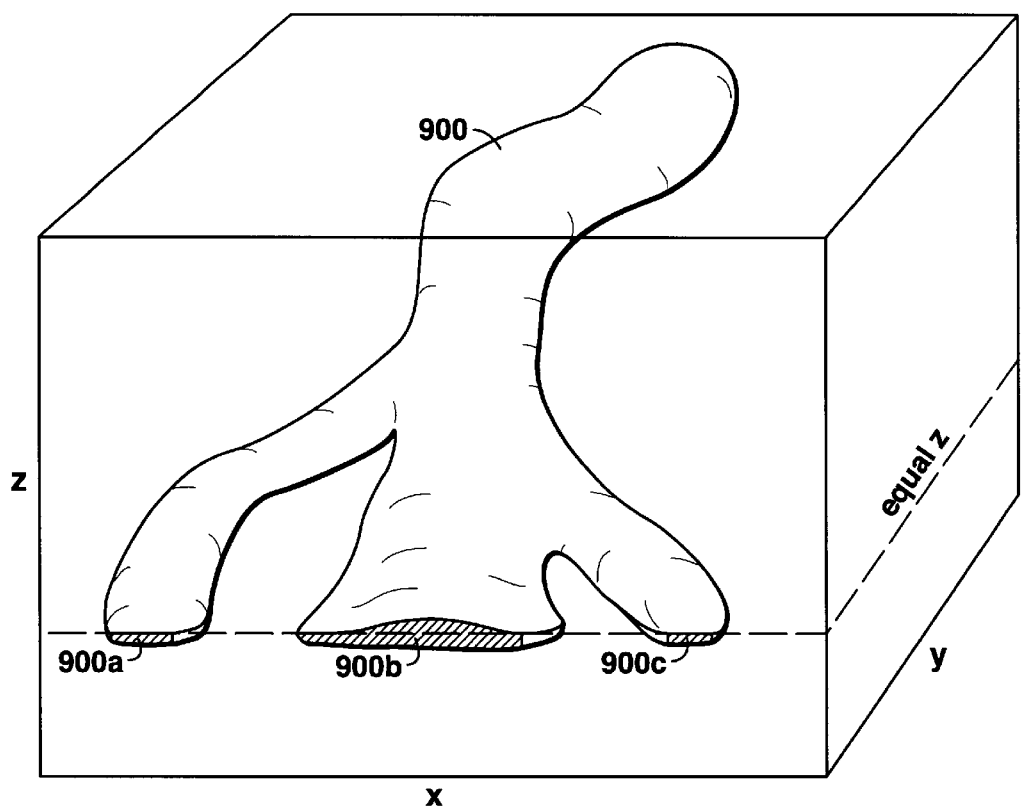
FIG. 9 illustrates a seismic object within a 3D seismic data cube showing multiple down dip terminations which are nearly co-planar in the vertical dimension (e.g., two way seismic signal travel time).

Geometric analysis of a 3D seismic object can provide valuable evidence of the existence of a hydrocarbon reservoir. For example, FIG. 9 shows a 3D seismic object 900. Seismic object 900 has three separate down dip terminations 900a, 900b, and 900c which are nearly co-planar in the vertical dimension (either two-way traveltime or vertical distance). This is indicative of an oil-water contact or a gas-oil contact. These co-planar terminations may be marked for further analysis in the statistical summary table 162, and highlighted in 3D displays of seismic object 900. Such "flat spot" detection is also possible on objects which are not digitate, but have a time-parallel down-dip limit.

The present invention may be used to generate a wide range of useful statistics for a potentially large number of seismic objects. To capture these data, the invention builds a statistical summary file (FIG. 1B, reference number 162) of the geometric measurements for the entire 3D seismic data volume or for a designated portion thereof (e.g., the portion corresponding to a specific stratigraphic zone). The results of the geometric analyses can be displayed as additional attributes of the original seismic data volume, and can be accessed via the interactive hierarchical tree interface.

Preferably, the display of processed seismic objects is controlled by user-specified criteria, including logical operations (e.g., equals(=), greater than(>), less than(<), less than or equal($\leq$), greater than or equal($\geq$), and(&), or( )). For example, the user may select all seismic objects in the 3D seismic data volume that have perimeters greater than 20,000 voxels and areas less than 50,000 voxels by entering the following text into the logic processor:

Perimeter>20000 & Area<50000.

This condition could be combined with an "or" statement to also select any seismic object with a volume greater than 100,000 voxels:

Perimeter>20000 & Area<50000 Volume>100000.

When the user is satisfied that the selected seismic objects meet their criteria for inclusion in the final geologic or reservoir model, the seismic objects are tagged and their volumetric coordinates may be output in binary or ascii format.

Persons skilled in the art will understand that the present invention is capable of analyzing and classifying the morphology of seismic objects using a wide range of morphologic parameters, including many that have not been described herein. It should be understood that the invention is not to be unduly limited to the foregoing, which has been set forth for illustrative purposes. Various modifications and alterations will be apparent to persons skilled in the art without departing from the true scope of the invention, as defined in the appended claims.

What is claimed is:

1. A method for analyzing and classifying the morphology of a seismic object extracted from a 3D seismic data volume, comprising:
   selecting one or more morphologic parameters for use in classifying the morphology of said seismic object;
   performing geometric analyses of said seismic object to determine geometric statistics corresponding to said one or more morphologic parameters; and
   using said geometric statistics to classify the morphology of said seismic object according to said one or more morphologic parameters.

2. The method of claim 1, wherein said seismic object comprises seismic amplitude data.

3. The method of claim 1, wherein said seismic object comprises seismic impedance data.

4. The method of claim 1, wherein said seismic object comprises seismic attribute data.

5. A method for analyzing and classifying the morphology of a seismic object extracted from a 3D seismic data volume, comprising:
   fitting one or more surfaces to said seismic object;
   selecting one or more morphologic parameters for use in classifying the morphology of said seismic object;
   performing geometric analyses of said seismic object and said one or more surfaces to determine geometric statistics corresponding to said one or more morphologic parameters; and
   using said geometric statistics to classify the morphology of said seismic object according to said one or more morphologic parameters.

6. The method of claim 5, wherein said one or more surfaces are selected from the group consisting of surfaces conforming to the top, middle, and base of said seismic object.

7. A method for analyzing and classifying the morphology of a seismic object contained in a 3D seismic data volume for a specified subsurface region, comprising:
   extracting said seismic object from said 3D seismic data volume;
   selecting one or more morphologic parameters for use in classifying the morphology of said seismic object;
   performing geometric analyses of said seismic object to determine geometric statistics corresponding to said morphologic parameters; and
   using said geometric statistics to classify the morphology of said seismic object according to said one or more morphologic parameters.

8. The method of claim 7, said method further comprising the step of fitting one or more surfaces to said seismic object, and wherein said geometric analyses include geometric analyses of said one or more surfaces.

9. The method of claim 7, wherein said one or more surfaces are selected from the group consisting of surfaces conforming to the top, middle, and base of said seismic object.

10. A method for analyzing and classifying the morphology of seismic objects contained in a 3D seismic data volume for a specified subterranean region, comprising:
    extracting one or more seismic objects from said 3D seismic data volume;
    selecting one or more morphologic parameters for use in classifying the morphology of said extracted seismic objects;
    selecting one of said extracted seismic objects and performing geometric analyses of said seismic object to determine geometric statistics corresponding to said morphologic parameters;
    using said geometric statistics to classify the morphology of said extracted seismic object according to said one or more morphologic parameters; and
    repeating said geometric analyses and said classification for each other extracted seismic object.

11. The method of claim 10, said method further comprising the step of fitting one or more surfaces to each extracted seismic object, and wherein said geometric analyses of each extracted seismic object include geometric analyses of said one or more surfaces fit to said extracted seismic object.

12. The method of claim 11, wherein said one or more surfaces are selected from the group consisting of surfaces conforming to the top, middle, and base of said seismic object.

13. The method of claim 10, wherein said step of extracting one or more seismic objects from said 3D seismic data volume comprises performing a discontinuity analysis of said 3D seismic data volume to locate and identify boundaries between said seismic objects.

14. The method of claim 10, wherein said step of extracting one or more seismic objects from said 3D seismic data volume comprises performing a connectivity analysis of said 3D seismic data volume to locate and identify groups of connected data points.

15. The method of claim 14, wherein said connectivity analysis further comprises:
    dividing said subterranean region into cells and determining from said seismic data the value of a preselected seismic attribute in each cell;
    choosing a threshold criterion for the value of the seismic attribute;
    determining for each cell whether the value of the selected attribute for that cell satisfies the chosen criterion;
    identifying seismic objects containing only connected cells that satisfy the attribute criterion, using a preselected definition of connectivity;
    repeating said choosing, determining, and identifying steps for at least one different value of the attribute threshold; and
    tracking each seismic object identified for changes in its size, spatial position, and connection to other objects, all as a function of attribute threshold value.

16. The method of claim 10, wherein said 3D seismic data volume comprises seismic amplitude data.

17. The method of claim 10, wherein said 3D seismic data volume comprises seismic impedance data.

18. The method of claim 10, wherein said 3D seismic data volume comprises seismic attribute data.

19. The method of claim 11, wherein said morphologic parameters are selected from the group consisting of perimeter, area, volume, maximum thickness, minimum thickness, mean thickness, standard deviation of thickness, major and minor axes from principal component analyses, hierarchical medial axis skeleton analysis, 3D edge and surface curvature analysis, and time-conformable edge analysis.

* * * * *